(12) United States Patent
Foubert

(10) Patent No.: US 7,904,997 B2
(45) Date of Patent: Mar. 15, 2011

(54) BUCKLES FOR INFLATABLE PERSONAL RESTRAINT SYSTEMS AND ASSOCIATED SYSTEMS AND METHODS

(75) Inventor: Daniel Nick Foubert, Maricopa, AZ (US)

(73) Assignee: AmSafe, Inc., Phoenix, AZ (US)

( * ) Notice: Subject to any disclaimer, the term of this patent is extended or adjusted under 35 U.S.C. 154(b) by 292 days.

(21) Appl. No.: 12/267,430

(22) Filed: Nov. 7, 2008

(65) Prior Publication Data

US 2010/0115737 A1  May 13, 2010

(51) Int. Cl.
  *A44B 11/25* (2006.01)
  *B60R 21/18* (2006.01)
  *B60R 22/12* (2006.01)
  *B60R 22/00* (2006.01)

(52) U.S. Cl. .......... 24/631; 24/633; 280/733; 280/801.1
(58) Field of Classification Search ............... 24/631, 24/633; 280/733, 801.1
See application file for complete search history.

(56) References Cited

U.S. PATENT DOCUMENTS

| | | |
|---|---|---|
| 1,079,080 A | 11/1913 | Ward |
| 1,438,898 A | 12/1922 | Carpmill |
| 2,538,641 A | 1/1951 | Elsner |
| 2,549,841 A | 4/1951 | Morrow et al. |
| 2,639,852 A | 5/1953 | Sanders et al. |
| 2,641,813 A | 6/1953 | Loxham |
| 2,710,999 A | 6/1955 | Davis |
| 2,803,864 A | 8/1957 | Bishaf |
| 2,846,745 A | 8/1958 | Lathrop |
| 2,869,200 A | 1/1959 | Phillips et al. |
| 2,876,516 A | 3/1959 | Cummings |
| 2,893,088 A | 7/1959 | Harper et al. |
| 2,901,794 A | 9/1959 | Prete, Jr. |
| 2,938,254 A | 5/1960 | Gaylord |
| 2,965,942 A * | 12/1960 | Carter ............................ 24/644 |
| 3,029,487 A | 4/1962 | Asai |
| 3,118,208 A | 1/1964 | Wexler |
| 3,179,992 A | 4/1965 | Murphy, Sr. |
| 3,218,685 A | 11/1965 | Atumi |

(Continued)

FOREIGN PATENT DOCUMENTS

DE  4421688  12/1995

(Continued)

OTHER PUBLICATIONS

U.S. Appl. No. 10/816,013, filed Apr. 1, 2004, Baldwin et al.

(Continued)

*Primary Examiner* — Robert J Sandy
(74) *Attorney, Agent, or Firm* — Perkins Coie LLP

(57) ABSTRACT

Buckles for inflatable personal restraint systems and associated systems and methods. In one embodiment, a buckle assembly can include a body and a latching mechanism carried by the body. The latching mechanism is configured to engage a corresponding tongue portion when the tongue is inserted into a front portion of the body. The buckle assembly also includes a cover operably coupled to the body and configured to pivotably move about an axis between a first position in which the latching mechanism engages the tongue and a second position in which the latching mechanism disengages the tongue. The buckle assembly further includes one or more counterweight components carried by the body and positioned such that the buckle assembly has a center of gravity (a) between the front portion of the body and a vertical plane extending through the axis, and (b) below a horizontal plane extending through the axis.

13 Claims, 4 Drawing Sheets

U.S. PATENT DOCUMENTS

| | | |
|---|---|---|
| 3,226,791 A | 1/1966 | Carter |
| 3,256,576 A | 6/1966 | Klove, Jr. et al. |
| 3,262,169 A | 7/1966 | Jantzen |
| 3,289,261 A | 12/1966 | Davis |
| 3,312,502 A | 4/1967 | Coe |
| 3,369,842 A | 2/1968 | Adams et al. |
| 3,491,414 A | 1/1970 | Stoffel |
| 3,505,711 A | 4/1970 | Carter |
| 3,523,342 A | 8/1970 | Spires |
| 3,564,672 A | 2/1971 | McIntyre |
| 3,591,900 A | 7/1971 | Brown |
| 3,605,207 A | 9/1971 | Glauser et al. |
| 3,605,210 A | 9/1971 | Lohr |
| 3,631,571 A | 1/1972 | Stoffel |
| 3,639,948 A | 2/1972 | Sherman |
| 3,644,967 A | 2/1972 | Romanzi, Jr. et al. |
| 3,648,333 A | 3/1972 | Stoffel |
| 3,673,645 A | 7/1972 | Burleigh et al. |
| 3,678,542 A | 7/1972 | Prete, Jr. |
| 3,714,684 A | 2/1973 | Gley |
| 3,760,464 A | 9/1973 | Higuchi |
| 3,825,979 A | 7/1974 | Jakob |
| 3,879,810 A | 4/1975 | Prete, Jr. et al. |
| 3,935,618 A | 2/1976 | Fohl et al. |
| 3,986,234 A | 10/1976 | Frost et al. |
| 4,051,743 A | 10/1977 | Gaylord |
| D248,618 S | 7/1978 | Anthony |
| 4,100,657 A | 7/1978 | Minolla et al. |
| 4,118,833 A | 10/1978 | Knox et al. |
| 4,128,924 A | 12/1978 | Happel et al. |
| 4,148,224 A | 4/1979 | Craig |
| 4,181,832 A | 1/1980 | Ueda et al. |
| 4,184,234 A | 1/1980 | Anthony et al. |
| 4,196,500 A | 4/1980 | Happel et al. |
| 4,228,567 A | 10/1980 | Ikesue et al. |
| 4,239,260 A | 12/1980 | Hollowell |
| 4,262,396 A | 4/1981 | Koike et al. |
| 4,317,263 A | 3/1982 | Fohl et al. |
| 4,321,734 A | 3/1982 | Gandelman |
| 4,334,341 A | 6/1982 | Krautz et al. |
| 4,336,636 A | 6/1982 | Ishiguro et al. |
| 4,366,604 A | 1/1983 | Anthony et al. |
| 4,408,374 A | 10/1983 | Fohl et al. |
| 4,425,688 A | 1/1984 | Anthony et al. |
| 4,457,052 A | 7/1984 | Hauber |
| 4,545,097 A | 10/1985 | Wier et al. |
| D285,383 S | 9/1986 | Anthony |
| 4,617,705 A | 10/1986 | Anthony et al. |
| 4,637,102 A | 1/1987 | Teder et al. |
| 4,638,533 A | 1/1987 | Gloomis et al. |
| 4,640,550 A | 2/1987 | Hankansson et al. |
| 4,644,618 A | 2/1987 | Holmberg et al. |
| 4,646,400 A | 3/1987 | Tanaka et al. |
| 4,648,483 A | 3/1987 | Skyba |
| 4,651,946 A | 3/1987 | Anthony et al. |
| 4,660,889 A | 4/1987 | Anthony et al. |
| 4,679,852 A | 7/1987 | Anthony et al. |
| 4,682,791 A | 7/1987 | Ernst et al. |
| 4,685,176 A | 8/1987 | Burnside et al. |
| 4,692,970 A | 9/1987 | Anthony et al. |
| 4,711,003 A | 12/1987 | Gelula |
| 4,716,630 A | 1/1988 | Skyba |
| 4,720,148 A | 1/1988 | Anthony et al. |
| 4,726,625 A | 2/1988 | Bougher |
| 4,727,628 A | 3/1988 | Rudholm et al. |
| D296,678 S | 7/1988 | Lortz et al. |
| 4,757,579 A | 7/1988 | Nishino et al. |
| 4,766,654 A * | 8/1988 | Sugimoto .................. 24/637 |
| 4,790,597 A | 12/1988 | Bauer et al. |
| 4,809,409 A | 3/1989 | Van Riesen et al. |
| 4,832,410 A | 5/1989 | Bougher |
| 4,843,688 A | 7/1989 | Ikeda et al. |
| D303,232 S | 9/1989 | Lortz et al. |
| 4,876,770 A | 10/1989 | Bougher |
| 4,876,772 A | 10/1989 | Anthony et al. |
| 4,911,377 A | 3/1990 | Lortz et al. |
| 4,919,484 A | 4/1990 | Bougher et al. |
| 4,934,030 A | 6/1990 | Spinosa et al. |
| 4,940,254 A | 7/1990 | Ueno et al. |
| 4,942,649 A | 7/1990 | Anthony et al. |
| 5,015,010 A | 5/1991 | Homeier et al. |
| 5,023,981 A | 6/1991 | Anthony et al. |
| 5,029,369 A * | 7/1991 | Oberhardt et al. .............. 24/633 |
| 5,031,962 A | 7/1991 | Lee |
| 5,038,446 A | 8/1991 | Anthony et al. |
| 5,039,169 A | 8/1991 | Bougher et al. |
| 5,067,212 A | 11/1991 | Ellis |
| 5,074,011 A | 12/1991 | Carlson |
| 5,084,946 A | 2/1992 | Lee |
| 5,088,160 A | 2/1992 | Warrick |
| 5,088,163 A | 2/1992 | van Riesen et al. |
| 5,119,532 A | 6/1992 | Tanaka et al. |
| 5,142,748 A | 9/1992 | Anthony et al. |
| 5,159,732 A | 11/1992 | Burke et al. |
| 5,160,186 A | 11/1992 | Lee |
| 5,170,539 A | 12/1992 | Lundstedt et al. |
| D332,433 S | 1/1993 | Bougher |
| 5,176,402 A | 1/1993 | Coulon |
| 5,182,837 A | 2/1993 | Anthony et al. |
| 5,219,206 A | 6/1993 | Anthony et al. |
| 5,219,207 A | 6/1993 | Anthony et al. |
| 5,220,713 A | 6/1993 | Lane, Jr. et al. |
| D338,119 S | 8/1993 | Merrick |
| D342,465 S | 12/1993 | Anthony et al. |
| 5,267,377 A | 12/1993 | Gillis et al. |
| 5,269,051 A | 12/1993 | McFalls |
| 5,282,672 A | 2/1994 | Borlinghaus |
| 5,282,706 A | 2/1994 | Anthony et al. |
| 5,283,933 A | 2/1994 | Wiseman et al. |
| 5,286,090 A | 2/1994 | Templin et al. |
| 5,292,181 A | 3/1994 | Dybro |
| 5,308,148 A | 5/1994 | Peterson et al. |
| 5,311,653 A | 5/1994 | Merrick |
| 5,369,855 A | 12/1994 | Tokugawa et al. |
| 5,370,333 A | 12/1994 | Lortz et al. |
| 5,375,879 A | 12/1994 | Williams et al. |
| 5,380,066 A | 1/1995 | Wiseman et al. |
| 5,392,535 A | 2/1995 | Van Noy et al. |
| 5,406,681 A | 4/1995 | Olson et al. |
| D359,710 S | 6/1995 | Chinni et al. |
| 5,432,987 A | 7/1995 | Schroth et al. |
| 5,443,302 A | 8/1995 | Dybro |
| 5,451,094 A | 9/1995 | Templin et al. |
| D364,124 S | 11/1995 | Lortz et al. |
| 5,471,714 A | 12/1995 | Olson et al. |
| 5,497,956 A | 3/1996 | Crook |
| 5,511,856 A | 4/1996 | Merrick et al. |
| 5,516,199 A | 5/1996 | Crook et al. |
| 5,526,556 A | 6/1996 | Czank |
| 5,561,891 A | 10/1996 | Hsieh et al. |
| 5,566,431 A * | 10/1996 | Haglund .................. 24/633 |
| 5,568,676 A | 10/1996 | Freeman |
| 5,584,107 A | 12/1996 | Koyanagi et al. |
| 5,588,189 A | 12/1996 | Gorman et al. |
| 5,606,783 A | 3/1997 | Gillis et al. |
| 5,695,243 A | 12/1997 | Anthony et al. |
| 5,699,594 A | 12/1997 | Czank et al. |
| D389,426 S | 1/1998 | Merrick et al. |
| D397,063 S | 8/1998 | Woellert et al. |
| 5,813,097 A | 9/1998 | Woellert et al. |
| 5,839,793 A | 11/1998 | Merrick et al. |
| 5,873,635 A | 2/1999 | Merrick |
| D407,667 S | 4/1999 | Homeier |
| 5,908,223 A | 6/1999 | Miller |
| D416,827 S | 11/1999 | Anthony et al. |
| 5,979,026 A | 11/1999 | Anthony |
| 6,056,320 A | 5/2000 | Khalifa et al. |
| 6,065,367 A | 5/2000 | Schroth et al. |
| 6,230,370 B1 | 5/2001 | Nelsen |
| 6,260,884 B1 | 7/2001 | Bittner et al. |
| 6,295,700 B1 | 10/2001 | Plzak |
| 6,309,024 B1 | 10/2001 | Busch |
| 6,363,591 B1 | 4/2002 | Bell et al. |
| 6,418,596 B2 | 7/2002 | Haas et al. |
| 6,425,632 B1 | 7/2002 | Anthony et al. |
| 6,442,807 B1 | 9/2002 | Adkisson |
| 6,446,272 B1 | 9/2002 | Lee et al. |

| | | |
|---|---|---|
| 6,463,638 B1 | 10/2002 | Pontaoe |
| 6,467,849 B1 | 10/2002 | Deptolla et al. |
| 6,513,208 B1 | 2/2003 | Sack et al. |
| 6,543,101 B2 | 4/2003 | Sack et al. |
| 6,560,825 B2 | 5/2003 | Maciejczyk et al. |
| 6,588,077 B2 | 7/2003 | Katsuyama et al. |
| 6,619,753 B2 | 9/2003 | Takayama |
| 6,694,577 B2 | 2/2004 | Di Perrero et al. |
| 6,711,790 B2 | 3/2004 | Pontaoe |
| 6,719,326 B2 | 4/2004 | Schroth et al. |
| 6,722,697 B2 | 4/2004 | Krauss et al. |
| 6,733,041 B2 | 5/2004 | Arnold et al. |
| 6,749,150 B2 | 6/2004 | Kohlndorfer et al. |
| 6,763,557 B2 | 7/2004 | Steiff et al. |
| 6,796,007 B1 | 9/2004 | Anscher |
| 6,820,310 B2 | 11/2004 | Woodard et al. |
| 6,860,671 B2 | 3/2005 | Schulz |
| 6,868,585 B2 | 3/2005 | Anthony et al. |
| 6,868,591 B2 | 3/2005 | Dingman et al. |
| 6,871,876 B2 | 3/2005 | Xu |
| 6,921,136 B2 | 7/2005 | Bell et al. |
| 6,935,701 B1 | 8/2005 | Arnold et al. |
| 6,959,946 B2 | 11/2005 | Desmarais et al. |
| 6,962,394 B2 | 11/2005 | Anthony et al. |
| 6,969,122 B2 | 11/2005 | Sachs et al. |
| 6,997,479 B2 | 2/2006 | Desmarais et al. |
| 7,010,836 B2 | 3/2006 | Acton et al. |
| 7,080,856 B2 | 7/2006 | Desmarais et al. |
| 7,159,285 B2 | 1/2007 | Karlsson et al. |
| 7,182,370 B2 | 2/2007 | Arnold |
| 7,232,154 B2 | 6/2007 | Desmarais et al. |
| 7,263,750 B2 | 9/2007 | Keene et al. |
| 7,395,585 B2 | 7/2008 | Longley et al. |
| 7,404,239 B1 | 7/2008 | Walton et al. |
| D578,931 S | 10/2008 | Toltzman et al. |
| 7,461,866 B2 | 12/2008 | Desmarais et al. |
| 2005/0127660 A1 | 6/2005 | Liu |
| 2006/0277727 A1* | 12/2006 | Keene et al. .......... 24/638 |
| 2007/0241549 A1 | 10/2007 | Boelstler et al. |
| 2007/0257480 A1 | 11/2007 | Van Druff et al. |
| 2008/0100051 A1 | 5/2008 | Bell et al. |
| 2008/0100122 A1 | 5/2008 | Bell et al. |
| 2008/0172847 A1 | 7/2008 | Keene et al. |

FOREIGN PATENT DOCUMENTS

| | | |
|---|---|---|
| DE | 69019765 | 2/1996 |
| EP | 0380442 | 8/1990 |
| EP | 0608564 | 8/1994 |
| EP | 1153789 | 11/2001 |
| GB | 1047761 | 11/1966 |
| WO | WO-8603386 | 6/1986 |

OTHER PUBLICATIONS

Global Seating Systems LLC, "CCOPS," Cobra: Soldier Survival System, 1 page, undated. [Color Copy].

International Search Report and Written Opinion, PCT Application No. PCT/US2006/22367, Applicant: AmSafe, Inc., Date of Mailing: Sep. 18, 2006, 6 pages.

* cited by examiner

BUCKLES FOR INFLATABLE PERSONAL RESTRAINT SYSTEMS AND ASSOCIATED SYSTEMS AND METHODS

TECHNICAL FIELD

The following disclosure relates generally to buckles for inflatable personal restraint systems for use in vehicles and associated systems and methods.

BACKGROUND

Airbags can provide protection for occupants in many different types of vehicles during accidents or collisions. In cars, for example, airbags can deploy from the steering column, dashboard, side panel, etc., to protect the driver and/or passenger(s). During a sudden deceleration of the car, such as in a collision, the airbag rapidly inflates and deploys in front of, or to the side of, the driver and/or passenger(s). Although a seat belt will generally restrain a person during an accident, an airbag can provide additional protection. An airbag positioned in the steering column, for example, can expand in front of the driver to cushion his torso and head. The airbag can prevent the driver's head from hitting the steering wheel, and can also reduce the likelihood of whiplash. Airbags can also be deployed to provide protection from side impact collisions.

Although the airbags described above are common in automobiles, other types of airbags are used in other types of vehicles. These other types of airbags are useful because airbags that deploy from a specific location in an automobile (e.g., from the steering column) may not be as effective in other types of vehicles, or for occupants in different locations in a vehicle. To accommodate different vehicles and different occupant positions, airbags have been developed that deploy from seat belts. For example, such airbags can deploy from a lap belt and/or shoulder belt to provide additional protection during a sudden deceleration. These seat belt-deployable airbags can be used in various types of vehicles, including land-based vehicles, aircraft, etc.

DETAILED DESCRIPTION

The present disclosure describes buckles for inflatable personal restraint systems for use in vehicles and associated systems and methods. Many specific details are set forth in the following description and in FIGS. 1-2D to provide a thorough understanding of various embodiments of the disclosure. Other details describing well-known structures and systems often associated restraint systems, however, are not set forth below to avoid unnecessarily obscuring the description of the various embodiments of the disclosure.

Many of the details and features shown in the Figures are merely illustrative of particular embodiments of the disclosure. Accordingly, other embodiments can have other details and features without departing from the spirit and scope of the present disclosure. In addition, those of ordinary skill in the art will understand that further embodiments can be practiced without several of the details described below. Furthermore, various embodiments of the disclosure can include structures other than those illustrated in the Figures and are expressly not limited to the structures shown in the Figures. Moreover, the various elements and features illustrated in the Figures may not be drawn to scale.

Figure 1:
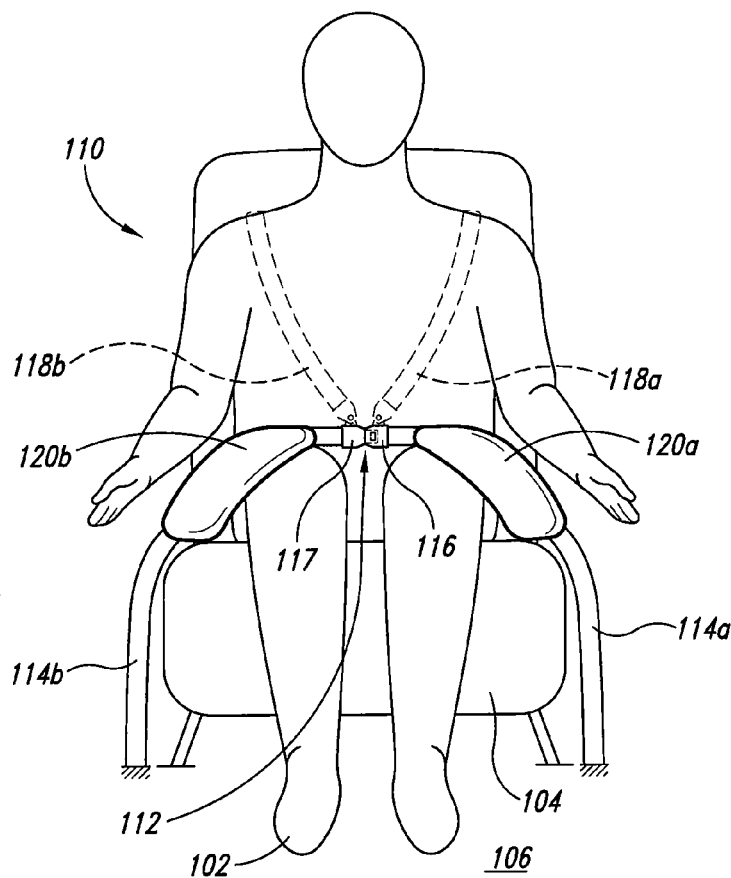
FIG. 1 is a partially schematic, front view of a vehicle occupant positioned in a restraint system configured in accordance with an embodiment of the disclosure.

FIG. 1 is a partially schematic, front view of a vehicle occupant 102 releasably secured in a seat 104 by a restraint system 110 configured in accordance with an embodiment of the disclosure. The seat 104 is secured in a vehicle 106, such as a commercial aircraft. It should be understood, however, that the restraint system 110 can be used with any type of vehicle (e.g., ground vehicles, automobiles, military vehicles, aircraft, rotorcraft, watercraft, spacecraft, etc.). The restraint system 110 includes multiple webs or belts extending around the occupant 102 and connected to each other with a buckle assembly 112. As used herein, "webs" can be any type of flexible straps or belts, such as seat belts made from a woven material as is known in the art. In the illustrated embodiment, for example, the restraint system 110 includes lap webs 114 (identified individually as a first lap web 114a and a second lap web 114b) having one or more inflatable portions or airbags 120. More specifically, a first lower airbag 120a is attached to and deployed from the first lap web 114a, and a second lower airbag 120b is attached to and deployed from the second lap web 114b. The first and second airbags 120a and 120b can be operably coupled to a gas source or inflator (not shown) and associated sensors and control modules (not shown) to initiate and/or control deployment of the airbags 120 in response to a dynamic event (e.g., a rapid deceleration, acceleration, collision, impact, etc.).

In the illustrated embodiment, each of the lower airbags 120 has a generally cylindrical or tubular shape when deployed that extends adjacent to the corresponding web in general alignment therewith. When the tubular airbags are deployed, they put the corresponding web portions in tension. For example, as the tubular airbags inflate, their cross-sectional areas increase thereby tensioning the corresponding web. The tubular airbags can provide lateral cushioning and stabilization for the occupant 102 during a rapid deceleration or other type of dynamic event. Further, each tubular airbag can provide an increased surface area of the corresponding web that contacts the occupant 102. The increased surface area can evenly distribute the force exerted by the corresponding web against the occupant 102 during the dynamic event, and reduce the localized pressure of the web(s) against the occupant 102.

One concern with conventional lift latch buckles for restraint systems having inflatable portions or airbags, however, is that the covers of such buckles can move or rotate during deployment of the airbag. More specifically, as the airbags (e.g., the first and second airbags 120a and 120b) are inflated, the forces associated with deployment of the airbags can cause the cover of the lift latch buckle to begin moving outwardly away from the buckle. In contrast with conventional lift latch buckles, however, the lift latch buckle assembly 112 includes a buckle 116 and a corresponding tongue portion or engagement element 117 configured to prevent movement or rotation of the cover during deployment of the corresponding airbags attached to the webs 114. Further details regarding embodiments of the buckle 116 are described below with reference to FIGS. 2A-2D.

In other embodiments, the restraint system 110 may include shoulder webs 118 (identified individually in broken lines as a first shoulder web 118a and a second shoulder web 118b) and/or a crotch web (not shown) operably coupled to the buckle assembly 112 to form a five-point restraint system. In still other embodiments, the restraint system 110 can have other web configurations, including a different number of webs, different types of webs, etc. For example, a single lap web 114 and/or a single shoulder web 118 can also be used. Accordingly, the present disclosure is not limited to the particular web configurations disclosed herein.

Moreover, in various embodiments, the lap webs 114 and other webs (e.g., shoulder webs 118, crotch webs) can include features typically associated with conventional webs and safety belts. For example, the lap webs 114 can include flexible segments of a fixed length and/or adjustable length to accommodate different sized occupants. The distal ends of the webs can also be attached to the vehicle 106 and/or seat 104 with an inertial reel, retractor, or other device to automatically adjust the fit of the webs in response to movement of the occupant 102. In other embodiments, the lap webs 114 and/or other webs may be manually adjusted, static, etc.

Figure 2A:
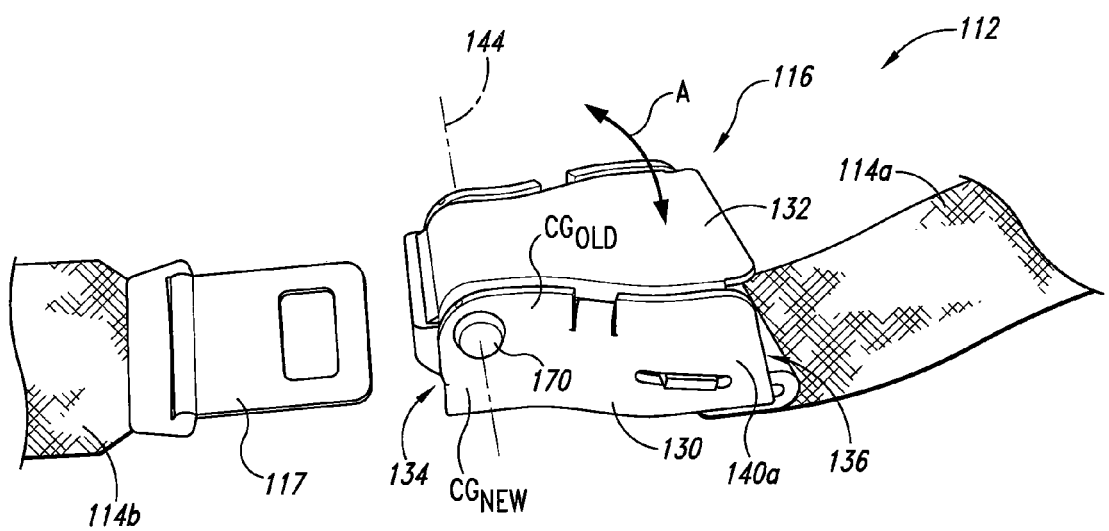
FIG. 2A is an isometric view of a buckle assembly configured in accordance with an embodiment of the disclosure with the buckle assembly in a closed configuration.

FIG. 2A is an isometric view of the buckle assembly 112 with the buckle 116 disengaged from the corresponding tongue portion 117. Various aspects of the interaction of the buckle assembly 112 and the tongue portion 117 are well known in the art, and do not require a detailed discussion here. The buckle 116 includes a body or frame 130 and a lift cover or top cover 132 movably coupled to the body 130. The body 130 includes a first or front portion 134 positioned to receive or mate with the tongue portion 117 and a second or back portion 136 positioned to receive the corresponding lap web portion (i.e., the first lap web 114a).

The lift cover 132 is pivotably coupled to the body 130 with a pin or axle 170. The pin 170 extends lengthwise along a lift axis 144, and the lift cover 132 is configured to pivot or rotate relative to the body 130 (as shown by the arrow A) about the lift axis 144. As shown and described in more detail below, the lift cover 132 is configured to pivotably move between (a) a first or closed position in which the lift cover 132 at least partially covers a number of internal components of the buckle 116 and the tongue portion 117 is releasably secured to the buckle 116, and (b) a second or open position (as best seen in FIG. 2D) in which the lift cover 132 is pivoted or rotated counterclockwise about the lift axis 144 and the tongue portion 117 is disengaged from the buckle 116.

As mentioned above with reference to FIG. 1, the buckle 116 is configured to prevent movement of the lift cover 132 due to the forces generated during deployment of the airbag (s). More specifically, the mass distribution of the various components of the buckle 116 attenuates the accelerations from the forces associated with the airbag deployment and counters the forces that tend to inadvertently move or rotate the lift cover 132 from the first or closed position. For example, as described in greater detail below, the buckle 116 can include one or more counterweight components at selected portions of the buckle 116 to selectively control the buckle's mass distribution. In the illustrated embodiment, for example, the buckle 116 includes a first counterweight component or feature 150 and a second counterweight component or feature 160 positioned at selected portions of the buckle 116 such that the buckle's center of gravity $CG_{NEW}$ is located below and forward of the lift axis 144. In this way, the lift cover 132 remains closed or at least approximately closed when the buckle 116 is accelerated or otherwise moved upon deployment of the airbag(s) because the moment arms of the lift cover 132 are balanced. For purposes of this specification (a) "below the lift axis" is defined as a location between a horizontal plane extending through the lift axis 144 and a bottom portion of the body 130, and (b) "forward of the lift axis" is defined as a location between a vertical plane extending through the lift axis 144 and the front portion 134 of the body 130.

In contrast with the arrangement of the buckle 116, conventional buckle assemblies typically have a center of gravity $CG_{OLD}$ located above and behind the lift axis 144. As discussed previously, buckle assembles having such a configuration tend to inadvertently move or rotate in operation. For purposes of this specification, (a) "above the lift axis" is defined as a location between the horizontal plane extending through the lift axis 144 and a top portion of the buckle 116, and (b) "behind the lift axis" is defined as a location at which the vertical plane extending through the lift axis is between the buckle's center of gravity (e.g., $CG_{OLD}$) and the front portion 134 of the body 130. It will be appreciated that the locations of $CG_{NEW}$ and $CG_{OLD}$ in FIG. 2A are merely representative of possible locations of a center of gravity for a buckle having the respective arrangements and may not be the actual center of gravity.

Figure 2B:
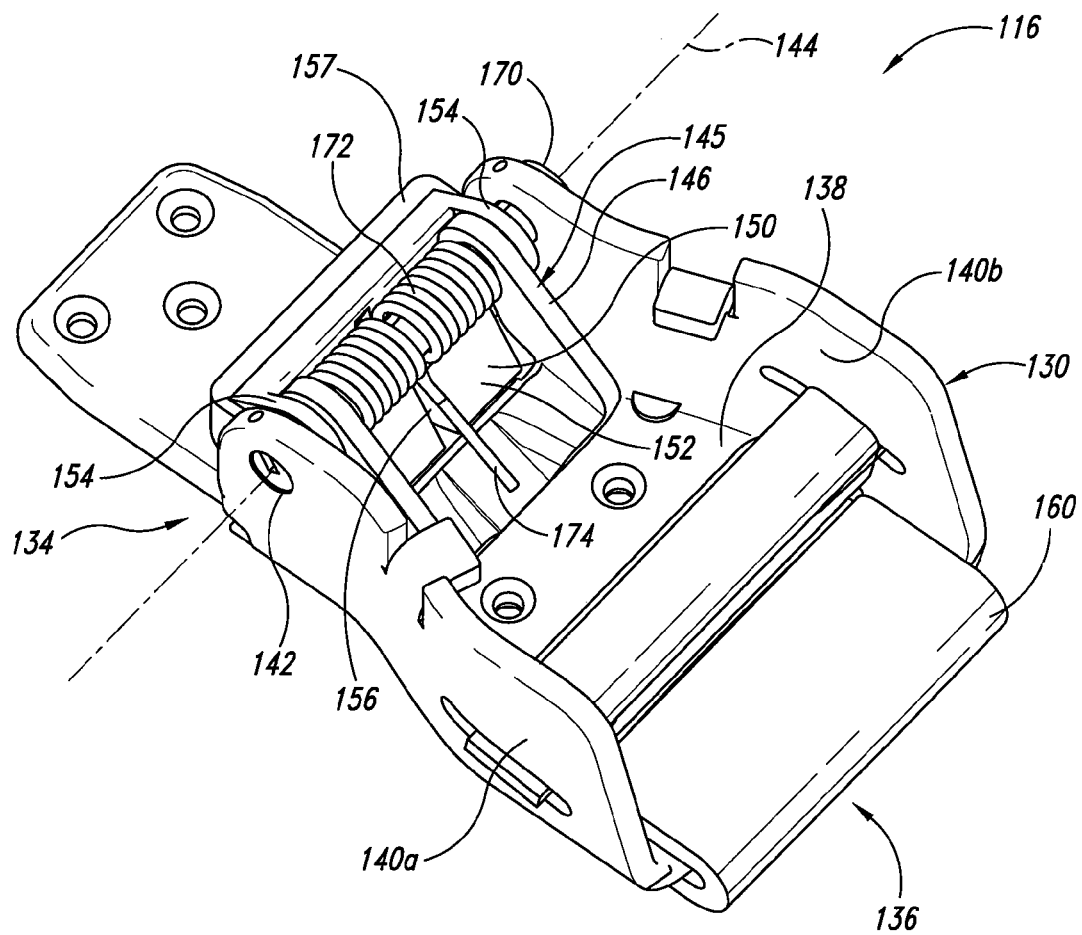
FIG. 2B is an isometric view of the buckle assembly of FIG. 2A.
Figure 2C:
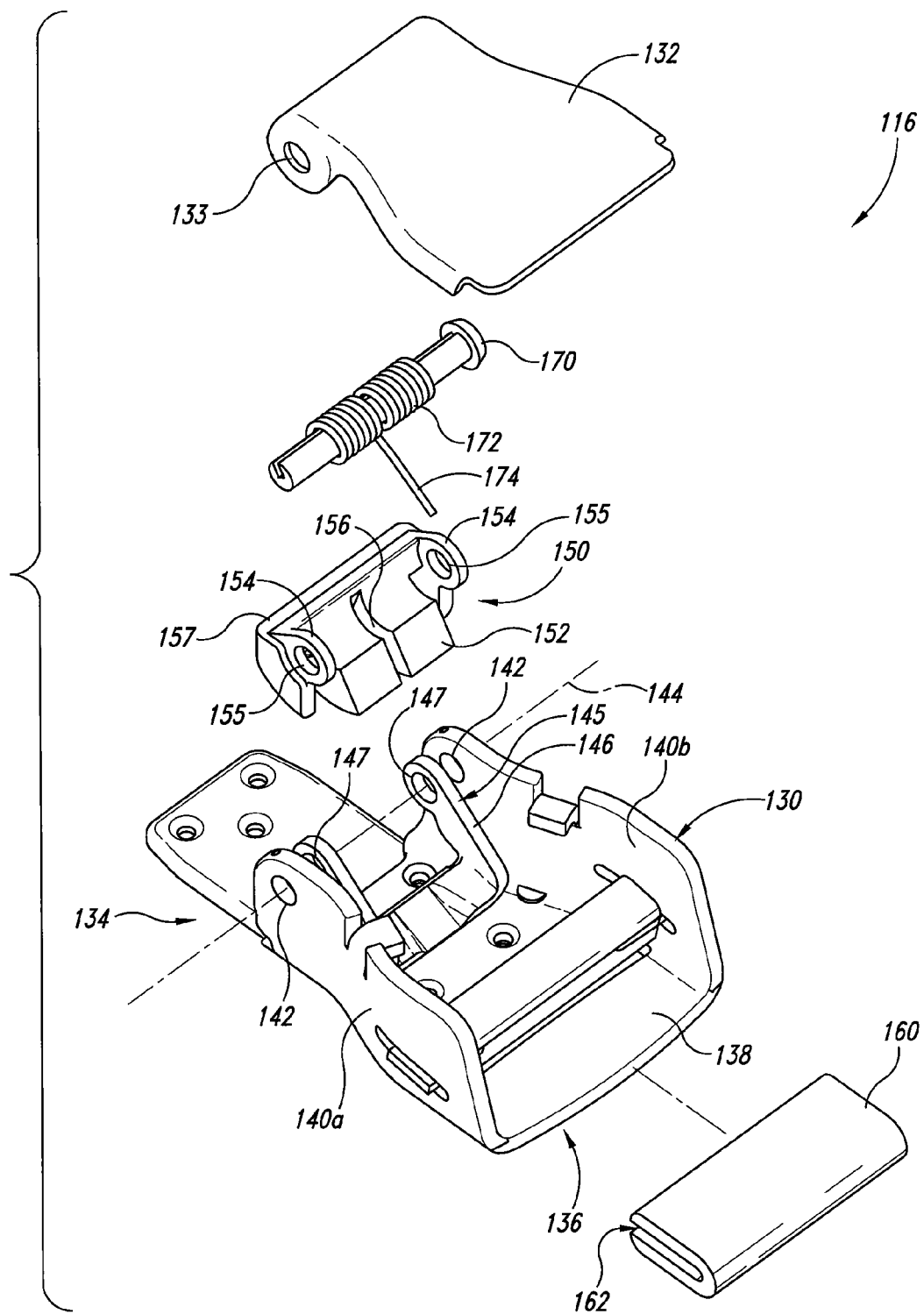
FIG. 2C is a partially exploded, isometric view of the buckle assembly of FIG. 2A.
Figure 2D:
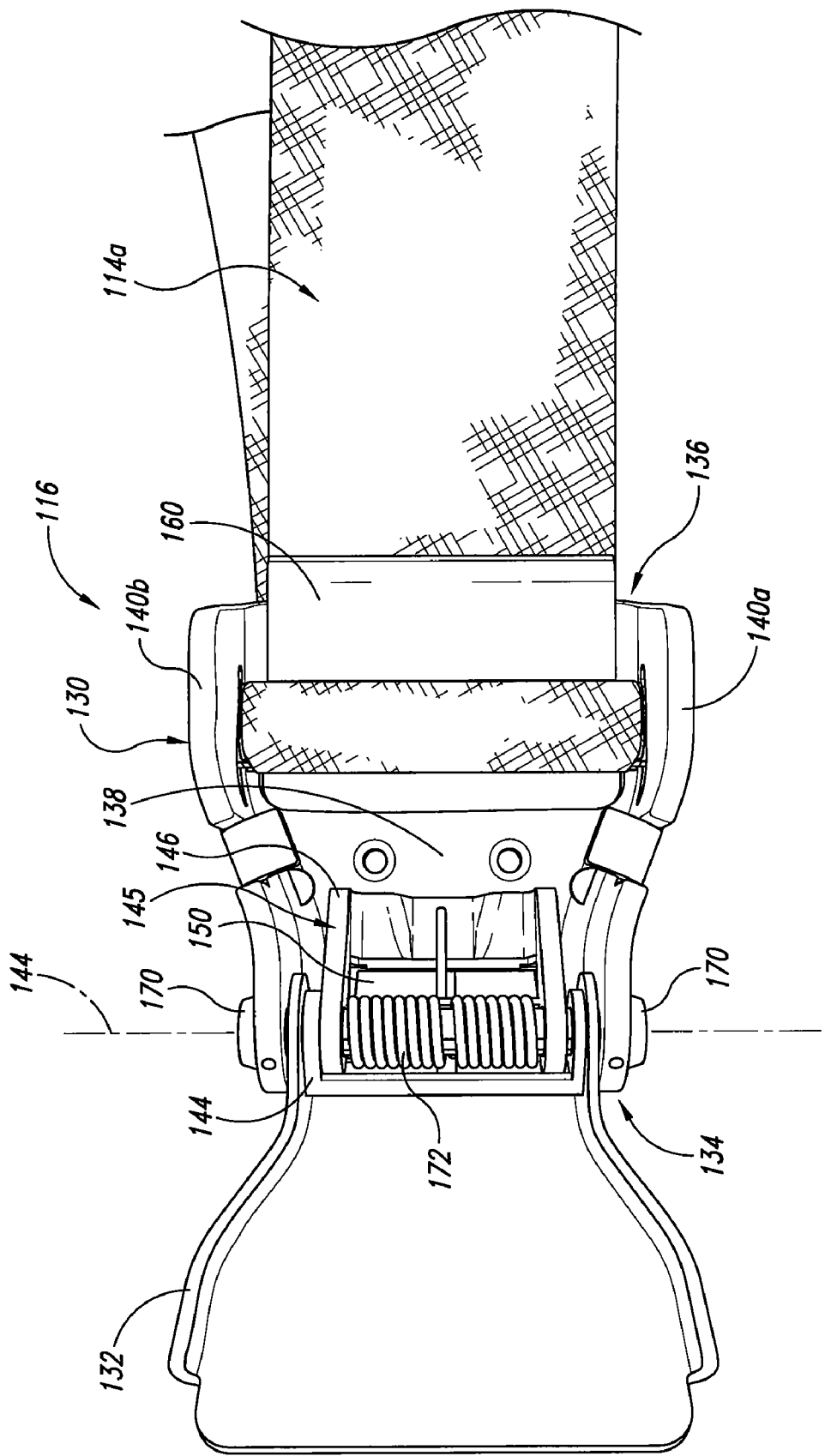
FIG. 2D is a top plan view of the buckle assembly of FIG. 2A in an open configuration.

FIG. 2B is an isometric view of the buckle 116 with the lift cover 132 removed for purposes of illustration, and FIG. 2C is partially exploded isometric view of the buckle 116. Referring to FIGS. 2B and 2C together, the body 130 can include a bottom or base portion 138 and two spaced apart, upstanding flanges or walls 140a and 140b. In the illustrated embodiment, for example, the bottom portion 138 and first and second flanges 140a and 140b are integral components. In other embodiments, however, the bottom portion 138 and the first and second flanges 140a and 140b may be separate components that are coupled together. The body 130 can further include apertures or openings 142 through each flange 140a and 140b and aligned with each other along the lift axis 144. As best seen in FIG. 2B, the apertures 142 are positioned to receive the pin 170. The body 130 can be composed of a variety of different materials (e.g., aluminum, steel, etc.). In other embodiments, however, the body 130 may include different features and/or have a different configuration.

The buckle 116 further includes a latching mechanism 145 configured to releasably engage the corresponding tongue portion 117. More specifically, the latching mechanism 145 can include a web or belt catch 146 carried by the body 130. The web catch 146 is positioned to releasably engage the corresponding tongue portion 117 (FIG. 2A) when the tongue portion is inserted into the buckle 116 and the lift cover 132 is in the first or closed position (as best seen in FIG. 2A). The web catch 146 includes apertures 147 at least generally aligned with the apertures 142 in the body 130. The web catch 146 may be composed of material(s) generally similar to the body 130, or the web catch 146 may be composed of different materials.

The buckle 116 also includes the first counterweight component 150 proximate to the front portion 134 of the body 130. As best seen in FIG. 2C, the first counterweight component 150 includes a base portion 152 and flanges 154 projecting from the base 152. The flanges 154 include apertures 155 configured to be at least generally aligned with the apertures 142 and 147 of the body 130 and web catch 146, respectively, when the first counterweight component 150 is installed with the buckle assembly 116 (as best seen in FIG. 2B). The base 152 can also include a slit or channel 156 configured to receive a portion of a resilient member, biasing member, or spring 172 (described in greater detail below). In one particular aspect of this embodiment, the first counterweight component 150 is heavier than the lift cover 132. For example, the first counterweight component 150 may be composed of zinc, steel, or other suitable materials. In other embodiments, the first counterweight component 150 can have a different arrangement, include different features, and/or be composed of a different material.

As discussed above, the pin or axle 170 is configured to extend lengthwise along the lift axis 144, through the apertures 147 and 155, and through at least a portion of the apertures 142. The pin 170 can be composed of steel, aluminum, plastic, or other suitable materials. The spring 172, for example, can comprise a coil spring disposed about at least a portion of the pin 170. The spring 172 can include an engagement portion or leg 174 extending from the spring 172 in a direction generally normal to the lift axis 144. The engagement portion 174 is positioned to be received in at least a portion of the slit 156 of the first counterweight component 150. In other embodiments, the spring 172 may include other types of resilient members in addition to, or in lieu of, the coil spring.

The lift cover 132 is configured to be pivotably coupled to the body 130 and move between the first (closed) and second (open) positions. More specifically, the lift cover 132 includes two apertures 133 (only one is shown in FIG. 2C) positioned to receive at least a portion of the pin 170 to couple the lift cover 132 to the body 130. In this way, the lift cover 132 can be pivotably moved about the lift axis 144. The lift cover 132 may be composed of aluminum, plastic, or other suitable materials. In one particular aspect of the illustrated embodiment, the lift cover 132 is composed of a selected material such that the lift cover 132 weighs less than the first counterweight component 150. In other embodiments, however, the lift cover 132 may be composed of different materials and/or may have a different configuration.

The second counterweight component 160 is configured to be attached to the rear portion 136 of the body 130. In the illustrated embodiment, for example, the second counterweight component 160 is a generally U-shaped member having a slit or channel 162 that is slidably received by at least a portion of the body 130 (as best seen in FIG. 2B) to releasably couple the second counterweight component 160 to the body 130. In other embodiments, however, the second counterweight component 160 may have a different configuration and/or be attached to the body 130 using other methods. For example, the second counterweight component 160 may be semi-permanently or permanently attached to the body 130 using fasteners, adhesives, or other suitable means. In still other embodiments, the second counterweight component 160 may be an integral portion of the body 130. The second counterweight component 160 may be composed of materials generally similar to those of the first counterweight component 150 (e.g., zinc, steel, etc.).

The first and second counterweight components 150 and 160 are optional components that may not be used in some embodiments. For example, as discussed above, the counterweight components 150 and 160 are configured to control the buckle's mass distribution. In some embodiments, however, the first and/or second counterweight components 150 and 160 may not be necessary. For example, in lieu of the counterweight components, the size and/or mass of one or more individual components of the buckle 116 can be specifically tailored to move the center of gravity of the buckle 116 to the desired location below and forward of the lift axis 144.

FIG. 2D is a top plan view of the buckle 116 in the second or open position. More specifically, the lift cover 132 has been pivoted or rotated (e.g., approximately 90 degrees) about the lift axis 144 to the second or open position, thereby exposing a number of inner components of the buckle 116 and disengaging the tongue portion 117 (FIG. 2A). Various aspects of the operation of the lift cover 132 and spring 172 are well known in the art and do not require a detailed discussion here. In operation, for example, the spring 172 is configured to urge the lift cover 132 toward the first or closed position (as best seen in FIG. 2A). As a user (not shown) pivotably moves the lift cover 132 about the lift axis 144 toward the second or open position, the web catch 146 is configured to release the tongue portion 117 (FIG. 2A). When the user releases the lift cover 132, however, the spring 172 is configured to urge the lift cover 132 back to the closed position.

Embodiments of the buckle assembly 112 described above are expected to provide several advantages over conventional buckle assemblies. For example, as discussed previously, the covers of many conventional buckle assemblies move or rotate during airbag deployment. In contrast with these conventional devices, however, the mass distribution of the buckle 116 is configured to attenuate accelerations and other forces associated with airbag deployment during a rapid deceleration or other type of dynamic event. The buckle 116 is accordingly configured to counter the forces that tend to inadvertently move or rotate the lift cover 132 and thereby enhance the locking capability of the buckle assembly 112. Thus, the buckle assembly 112 is expected to remain in a closed or engaged position during such events.

From the foregoing, it will be appreciated that specific embodiments have been described herein for purposes of illustration, but that various modifications may be made without deviating from the spirit and scope of the various embodiments of the disclosure. For example, the restraint systems described above can include one or more airbags in addition to those illustrated in the Figures. In addition, the buckle assembly 112 described above with reference to FIGS. 1-2D may have different configurations and/or include different features Moreover, specific elements of any of the foregoing embodiments can be combined or substituted for elements in other embodiments. For example, the buckle assemblies described in the context of specific automobile or aircraft systems can be implemented in a number of other non-automobile or non-aircraft systems. Certain aspects of the disclosure are accordingly not limited to automobile or aircraft systems. Furthermore, while advantages associated with certain embodiments of the disclosure have been described in the context of these embodiments, other embodiments may also exhibit such advantages, and not all embodiments need necessarily exhibit such advantages to fall within the scope of the invention. Accordingly, the disclosure is not limited, except as by the appended claims.

I claim:

1. A buckle assembly for use with an occupant restraint system of a vehicle, the buckle assembly comprising:
   a body;
   a latching mechanism carried by the body, wherein the latching mechanism is configured to releasably engage a corresponding tongue portion when the tongue portion is inserted into a front portion of the body;
   a cover operably coupled to the body and configured to pivotably move about an axis between a first position in which the latching mechanism engages the tongue portion and a second position in which the latching mechanism disengages the tongue portion; and
   one or more counterweight components carried by the body and positioned such that the buckle assembly has a center of gravity (a) between the front portion of the body and a vertical plane extending through the axis, and
(b) below a horizontal plane extending through the axis.

2. The buckle assembly of claim 1 wherein the one or more counterweight components comprise:
   a first counterweight component proximate to the front portion of the body and in contact with the latching mechanism; and
   a second counterweight component proximate to a rear portion of the body.

3. The buckle assembly of claim 2 wherein the first counterweight component has a first weight and the cover has a second weight less than the first weight.

4. The buckle assembly of claim 2 wherein:
   the cover is composed of aluminum or plastic; and
   the first and second counterweight components are composed of zinc or steel.

5. The buckle assembly of claim 2, further comprising a pin carried by the body and positioned to pivotably couple the cover to the body, wherein the pin extends lengthwise along the axis, and wherein:
   the first counterweight component includes a base portion and spaced apart flanges projecting from the base, wherein the individual flanges have apertures at least generally aligned with the axis and positioned to receive the pin, and wherein the base portion further includes a slit positioned to receive at least a portion of a resilient member carried by the pin.

6. The buckle assembly of claim 2 wherein the second counterweight component comprises a generally U-shaped member slidably received by a bottom portion of the body.

7. The buckle assembly of claim 2 wherein the second counterweight component is a non-permanent component that is removable from the body.

8. The buckle assembly of claim 2 wherein the first and second counterweight components are non-functional components of the buckle assembly.

9. The buckle assembly of claim 1 wherein:
   a rear portion of the body is attached to an end portion of a first elongate web configured to extend around a first portion of an occupant when an occupant is seated in vehicle;
   the tongue portion is attached to an end portion of a second elongate web configured to extend around a second portion of the occupant; and
   at least one of the first and second elongate webs includes an airbag carried by the corresponding web and configured to extend at least partially in front of the occupant when inflated.

10. The buckle assembly of claim 1 wherein:
    the body includes a bottom portion, spaced apart upstanding flanges along lateral edges of the bottom portion, and apertures through each of the flanges, wherein the apertures are generally aligned with the axis;
    the cover includes two spaced apart apertures; and
    the buckle assembly further comprises a pin extending through the apertures in the body and the apertures in the cover to pivotably couple the cover to the body.

11. A lift latch buckle for use with an occupant restraint system of a vehicle, the lift latch buckle comprising:
    a latching mechanism operably coupled to a buckle frame, wherein the buckle frame is operably coupled to a belt configured to extend across at least a portion of an occupant seated in the vehicle, and wherein the latching mechanism is configured to releasably engage a corresponding tongue plate when the tongue plate is inserted into a front portion of the buckle frame;
    a cover pivotably coupled to the front portion of the buckle frame, wherein the cover is configured to pivot about a lift axis between a first position in which the latching mechanism engages the tongue plate and a second position in which the latching mechanism disengages the tongue plate; and
    a first mass distribution component at the front portion of the buckle frame and in contact with the latching mechanism and a second mass distribution component at a rear portion of the buckle frame, wherein the lift latch buckle has a center of gravity forward of and below the lift axis.

12. The lift latch buckle of claim 11 wherein the first and second mass distribution components are non-functional components of the lift latch buckle.

13. The lift latch buckle of claim 11 wherein:
    the first and second mass distribution components are composed of a first material; and
    the cover is composed of a second material different than the first material.

* * * * *